(12) United States Patent
Servidio et al.

(10) Patent No.: US 12,458,375 B2
(45) Date of Patent: Nov. 4, 2025

(54) PROXIMAL HIP DRILL CLAMP WITH IMPLANT

(71) Applicant: Howmedica Osteonics Corp., Mahwah, NJ (US)

(72) Inventors: Damon J. Servidio, Towaco, NJ (US); Carlos E. Collazo, Old Greenwich, CT (US); G. Douglas Letson, Tampa, FL (US)

(73) Assignee: Howmedica Osteonics Corp., Mahwah, NJ (US)

( * ) Notice: Subject to any disclaimer, the term of this patent is extended or adjusted under 35 U.S.C. 154(b) by 320 days.

(21) Appl. No.: 18/125,408

(22) Filed: Mar. 23, 2023

(65) Prior Publication Data
US 2023/0310033 A1 Oct. 5, 2023

Related U.S. Application Data

(60) Provisional application No. 63/324,767, filed on Mar. 29, 2022.

(51) Int. Cl.
*A61B 17/17* (2006.01)
*A61B 17/68* (2006.01)
*A61F 2/46* (2006.01)
*A61B 17/56* (2006.01)

(52) U.S. Cl.
CPC .............. *A61B 17/17* (2013.01); *A61B 17/68* (2013.01); *A61B 2017/564* (2013.01)

(58) Field of Classification Search
CPC ............................ A61B 17/17; A61F 2/4603
See application file for complete search history.

(56) References Cited

U.S. PATENT DOCUMENTS

| 3,843,975 | A | 10/1974 | Tronzo |
| 3,939,498 | A | 2/1976 | Lee et al. |
| 4,153,953 | A | 5/1979 | Grobbelaar |
| 4,605,416 | A | 8/1986 | Grobbelaar |
| 4,698,063 | A | 10/1987 | Link et al. |
| 5,356,410 | A | 10/1994 | Pennig |
| 5,658,349 | A | 8/1997 | Brooks et al. |
| 5,702,479 | A | 12/1997 | Schawalder |
| 7,179,259 | B1 * | 2/2007 | Gibbs ................... A61F 2/4603 606/98 |
| 7,476,255 | B2 | 1/2009 | Lester et al. |
| 7,611,513 | B2 | 11/2009 | Deloge et al. |
| 7,632,272 | B2 | 12/2009 | Munro et al. |

(Continued)

FOREIGN PATENT DOCUMENTS

EP 0729732 A2 9/1996
FR 2983061 A1 5/2013

*Primary Examiner* — Christian A Sevilla
(74) *Attorney, Agent, or Firm* — Lerner David LLP

(57) ABSTRACT

A tool for implanting an orthopedic implant upon a bone includes a body defining an implant socket for releasably retaining an implant and a drill guide opening into the implant socket. The body is an insert receivable in an insert socket of a movable end of the tool. The tool also includes a tip toward which the implant socket faces and opposedly movable relative to the body. The tool is usable in a process that includes clamping a bone between the tip and the implant while the implant is retained in the implant socket. While the bone is clamped, a drill is driven through the drill guide to produce a hole in the bone.

17 Claims, 14 Drawing Sheets

(56) References Cited

U.S. PATENT DOCUMENTS

| | | | |
|---|---|---|---|
| 7,641,698 B1 | 1/2010 | Gibbs et al. | |
| 7,662,189 B2 | 2/2010 | Meswania | |
| 8,118,868 B2 | 2/2012 | May et al. | |
| 8,177,849 B2 | 5/2012 | Meyers et al. | |
| 8,216,239 B2 | 7/2012 | Munro et al. | |
| 8,252,061 B2 | 8/2012 | Mikami et al. | |
| 8,308,806 B2 | 11/2012 | Grant et al. | |
| 8,460,393 B2 * | 6/2013 | Smith | A61F 2/3601 623/20.16 |
| 8,623,093 B2 | 1/2014 | Dickerson | |
| 8,679,130 B2 * | 3/2014 | Smith | A61B 17/1753 606/89 |
| 8,734,448 B2 | 5/2014 | Thakkar | |
| 8,979,940 B2 | 3/2015 | Porter et al. | |
| 9,005,305 B2 | 4/2015 | Meyers et al. | |
| 9,050,150 B2 | 6/2015 | Vargas et al. | |
| 9,138,273 B2 | 9/2015 | Smith et al. | |
| 9,211,191 B2 | 12/2015 | Grant et al. | |
| 9,463,054 B2 | 10/2016 | Mueckter | |
| 10,188,520 B2 | 1/2019 | Smith et al. | |
| 10,278,749 B2 | 5/2019 | Jakob et al. | |
| 10,945,850 B2 | 3/2021 | Haidukewych et al. | |
| 2007/0123916 A1 * | 5/2007 | Maier | A61B 17/8866 606/151 |
| 2009/0164026 A1 | 6/2009 | Mikami et al. | |
| 2013/0261622 A1 | 10/2013 | Bonjour et al. | |
| 2014/0200619 A1 | 7/2014 | Smith et al. | |
| 2018/0014839 A1 * | 1/2018 | Fiedler | A61B 17/8866 |
| 2021/0169655 A1 | 6/2021 | Haidukewych et al. | |
| 2022/0008206 A1 | 1/2022 | LaReau | |

\* cited by examiner

PROXIMAL HIP DRILL CLAMP WITH IMPLANT

CROSS-REFERENCE TO RELATED APPLICATIONS

This application claims the benefit of the filing date of U.S. Provisional Patent Application No. 63/324,767, filed Mar. 29, 2022, the disclosure of which is hereby incorporated herein by reference.

BACKGROUND

Orthopedic implants may be used to secure bone segments to each other and/or soft tissue to bone. A receiving bone may need to be prepared in some way to enable permanent attachment of the implant, such as by drilling holes into the receiving bone. Bone preparation and implant placement are typically executed as separate steps. Thus, the implant, when placed, may not be perfectly aligned with the features prepared in the bone. This can be further complicated when soft tissue is attached to the bone using a fastener, such as a pin, wire, bone screw, bone anchor, and the like, to penetrate the soft tissue and engage the underlying bone preparation as the soft tissue may obscure the prepared bone from the view of the operator. Misalignments, operation times, and excessive soft tissue damage could therefore be reduced by a tool capable of consolidating the bone preparing and implant placing steps.

BRIEF SUMMARY

According to some aspects, a tool for clamping an orthopedic implant onto a bone and preparing the bone to have the implant secured thereto may include two opposedly movable ends. A first of the ends may include a tip for applying pressure to a surface of the bone. The tip may include spikes or other features for providing grip or traction between the tip and the surface of the bone. The tip may include one or more recesses or holes so that a drill driven through the bone may pass into the recess or hole without contacting the tip. A second of the ends may include a receiver defining an insert socket for releasably retaining an insert. The insert may include an implant socket for releasably retaining an implant in a position such that the implant may be pressed onto an opposite side of the bone from the surface contacted by the tip while the implant is in an intended final position for the implant. The insert may include one or more drill guides for drilling fastener holes into the bone while The insert may be one of a variety of inserts respectively adapted to retain different types of implants or guide a drill appropriately for different types of procedures.

The ends of the tool may be ends of two bars. The bars may be hingedly or pivotably connected to one another. The bars may be biased with respect to one another such that the ends are biased apart from one another. The bias may be provided by one or more resilient springs disposed between the bars. The tool may include a mechanism for adjusting a maximum distance between ends. The mechanism may also provide a mechanical advantage that facilitates the application of clamping pressure upon the bone. The mechanism may include a threaded rod extending between the bars. The mechanism may further include a knob on the threaded rod that has a variable position and limits the possible range of positions of the bars relative to one another to an extent that varies along with the position of the knob.

In another aspect, a tool for implanting an orthopedic implant upon a bone may comprise a body defining an implant socket for releasably retaining an implant and at least one drill guide opening into the implant socket. The tool may also comprise a tip toward which the implant socket faces and opposedly movable relative to the body for clamping the implant and bone between the body and tip.

In some arrangements according to any of the foregoing, the body may be part of an insert that is releasably retained within an insert socket defined within a receiver that is opposedly movable relative to the tip.

In some arrangements according to any of the foregoing, the receiver may be a hoop and the insert socket may be a space encircled by the hoop.

In some arrangements according to any of the foregoing, the insert may include a projection that extends into the socket and by which the insert is releasably retained in the insert socket.

In some arrangements according to any of the foregoing, the receiver may include a set screw drivable to extend into the insert socket by a variable distance to engage or disengage the projection.

In some arrangements according to any of the foregoing, the tip may be an end of a first bar and the receiver is an end of a second bar, and the first and second bars are hingedly connected to one another by a hinge.

In some arrangements according to any of the foregoing, the tool may comprise a first handle at an end of the first bar and a second handle at an end of the second bar and wherein the hinge connects the bars at a point between the first end and the first handle and between the second end and the second handle.

In some arrangements according to any of the foregoing, the first end and the second end may be biased apart from one another.

In some arrangements according to any of the foregoing, the biasing may be provided by at least one spring extending between the first bar and the second bar.

In some arrangements according to any of the foregoing, a maximum distance between the first end and the second end may be adjustable.

In some arrangements according to any of the foregoing, the tool may comprise a threaded rod coupled to either the first bar and the second bar and extends past the bar to which the threaded rod is not coupled. The tool may also comprise a knob disposed at a location on the threaded rod on an opposite side of the bar that the threaded rod extends past from the bar to which the threaded rod is coupled such that the knob is movable toward or away from the bar to which the threaded rod is coupled by rotation of the knob about a central axis of the threaded rod. In some arrangements according to any of the foregoing, the maximum distance between the first end and the second end is adjustable by rotation of the knob about the central axis of the threaded rod.

In some arrangements according to any of the foregoing, the implant socket may be a space defined by an implant contacting surface of the body and a perimeter defined by at least one flange extending from the body adjacent to the implant contacting surface.

In some arrangements according to any of the foregoing, the tool may comprise a movable plate additionally defining the implant socket and movable toward and away from the at least one flange.

In some arrangements according to any of the foregoing, a hole alignable with at least one of the drill guides may extend into the tip.

In some arrangements according to any of the foregoing, the tip may be a disc.

In another aspect, a tool for implanting an orthopedic implant upon a bone may comprise a first end defining a tip. The tool may also comprise a second end opposedly movable relative to the first end and defining an insert socket. The tool may also comprise an insert removably retainable within the insert socket and including an implant socket for removably retaining an orthopedic implant.

In some arrangements according to any of the foregoing, the insert may define at least one drill guide opening into the implant socket.

In another aspect, a method of implanting an orthopedic implant onto a bone may comprise clamping the bone between a tip of a tool and an implant retained by a portion of the tool opposedly movable relative to the tip. The method may also comprise forming a hole in the bone using a tool passing through the portion and implant.

In some arrangements according to any of the foregoing, the method may comprise reconditioning the bone before the clamping step.

In some arrangements according to any of the foregoing, the forming step may include drilling a hole in the bone while the bone is clamped between the tip and the implant.

In some arrangements according to any of the foregoing, the drilling step may include guiding a drill through a hole in the implant.

In some arrangements according to any of the foregoing, the drilling step may include guiding a drill through a drill guide defined through the portion.

In some arrangements according to any of the foregoing, the portion may be an insert retained within an insert socket defined by a receiver opposedly movable relative to the tip.

In some arrangements according to any of the foregoing, the forming step may include driving a self-tapping screw through the portion and implant and into the bone.

In another aspect, an orthopedic surgical system may comprise an orthopedic implant through which at least one hole extends. The system may also comprise a tool for implanting the orthopedic implant upon a bone. The tool may comprise a body defining at least one drill guide and an implant socket into which the drill guide opens. The implant socket may be configured to retain the implant in a position at which the hole is aligned with the drill guide. The tool may also comprise a tip toward which the implant socket faces and opposedly movable relative to the body for clamping the implant and bone between the body and tip.

In some arrangements according to any of the foregoing, the implant may comprise two holes extending therethrough and the body defines two drill guides opening into the implant socket. The implant socket may be configured to retain the implant in a position at which each hole is aligned with a respective one of the drill guides.

In some arrangements according to any of the foregoing, the implant may comprise at least one hook.

In some arrangements according to any of the foregoing, the implant may be retained within the implant socket such that the hole is aligned with the drill guide, the at least one hook extends away from the body.

In some arrangements according to any of the foregoing, the implant may comprise an osteointegrative layer formed of a material and structure conducive to osteointegration and a body layer differing in either or both of material and structure from the osteointegrative layer.

In some arrangements according to any of the foregoing, the implant may be retained within the implant socket such that the hole is aligned with the drill guide, the osteointegrative layer faces away from the body of the tool.

In some arrangements according to any of the foregoing, the implant may be retained within the implant socket such that the hole is aligned with the drill guide, the body layer of the implant contacts the body of the tool.

In some arrangements according to any of the foregoing, the tool may be configured to enable the body and the first end to translate relative to one another without the body and the first end rotating relative to one another.

In some arrangements according to any of the foregoing, the at least one drill guide may be one or more guide holes, and the system may further comprise one or more bushings that are receivable within the one or more guide holes.

In some arrangements according to any of the foregoing, an elongate fastener that extends along an axis, and a portion of the fastener having a largest diameter normal to the axis has a diameter normal to the axis that is larger than an internal diameter of the one or more bushings but smaller than an internal diameter of the one or more guide holes.

In another aspect, a method of treating a bone may comprise drilling a hole in the bone by passing a tool through the implant and a bushing received in a guide hole of a body that retains the implant. The method may also comprise removing the bushing from the guide hole. The method may also comprise inserting a fastener through the guide hole and the implant and into the bone after removing the bushing.

In some arrangements according to any of the foregoing, the method may comprise clamping the bone between a prosthesis and the implant before drilling the hole.

In some arrangements according to any of the foregoing, the method may comprise inserting the fastener into the prosthesis through the bone.

In some arrangements according to any of the foregoing, prosthesis may be configured to replace a proximal portion of a femur, and the bone is a greater femoral trochanter.

In some arrangements according to any of the foregoing, the method may comprise threadedly engaging the fastener to the prosthesis.

In some arrangements according to any of the foregoing, the method may comprise using the fastener to fasten the implant to the prosthesis.

In some arrangements according to any of the foregoing, the body may be part of an assembly that includes a tool, and the tool may include a first end that is opposedly movable relative to the body.

In some arrangements according to any of the foregoing, the body may be an insert that is releasably connected to a second end of the tool.

In some arrangements according to any of the foregoing, the first end may be releasably connected to the prosthesis.

In some arrangements according to any of the foregoing, the tool may be configured to enable the body and the first end to translate relative to one another without the body and the first end rotating relative to one another.

DETAILED DESCRIPTION

Figure 1:
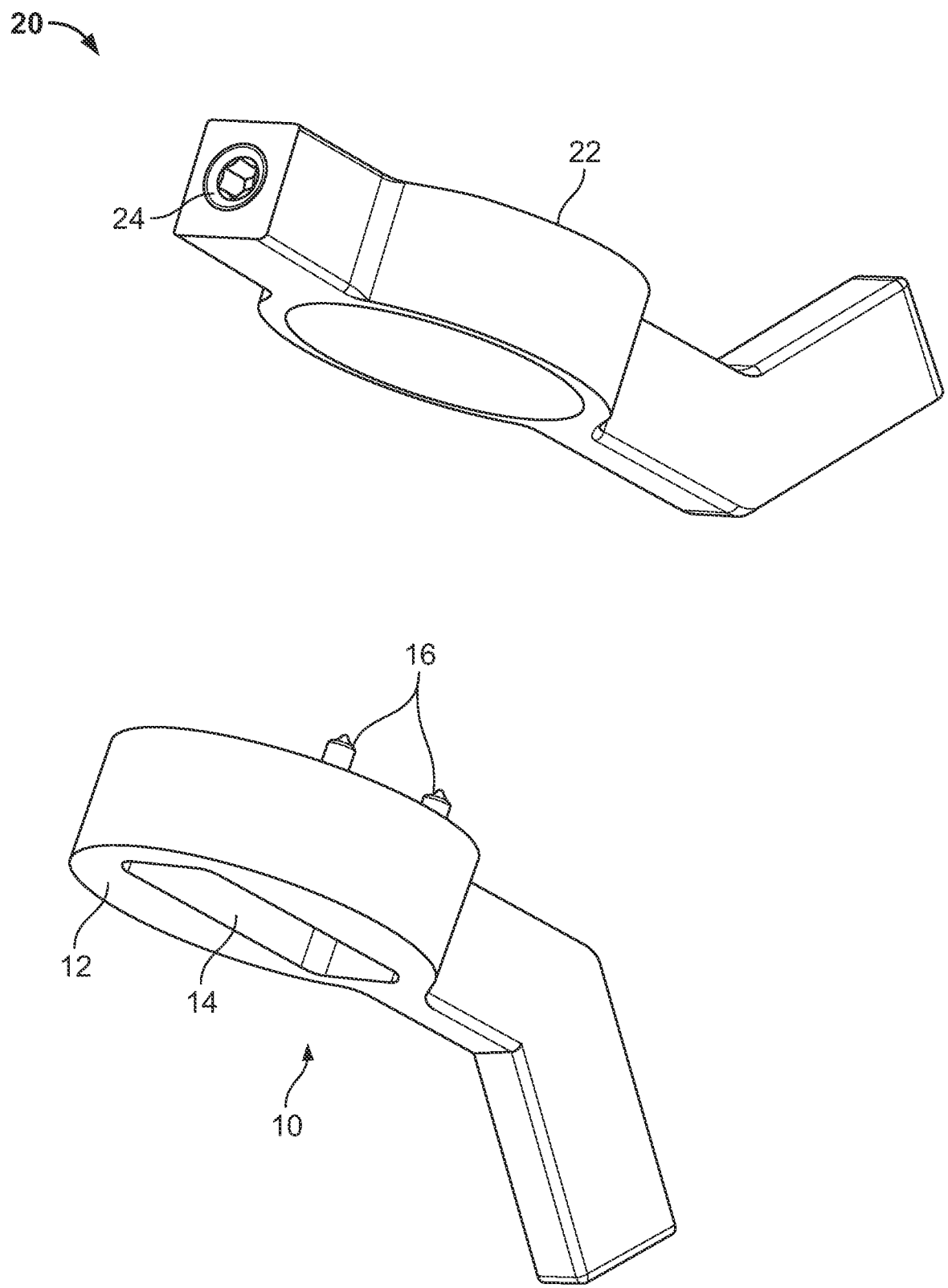
FIG. 1 is a perspective view of two ends of a clamp and drill guide device.

A first end 10 and a second end 20 as shown in FIG. 1 are two parts of a clamp and drill guide tool. First end 10 includes a disc 12 through which a clearance hole 14 extends and spikes 16 that extend from disc 12 toward second end 20. Clearance hole 14 is sized and shaped such that a drill travelling along an intended trajectory for each hole to be created in a drilling procedure that will be detailed below may pass through clearance hole 14 without contacting disc 12. Spikes 16 are provided in two pairs, only one of which being visible from the perspective of FIG. 1, placed symmetrically on opposite sides of clearance hole 16. In alternative arrangements, clearance hole 14 may differ in number, size, and placement, such as by inclusion of a separate clearance hole 14 for each hole to be drilled. In further alternatives, clearance hole 14 may not extend all the way through disc 12 and may instead only extend into disc 12 from the same side of disc 12 as that from which spikes 16 extend by a distance that is less than a total thickness of disc 12. Alternative arrangements of first end 10 may also include spikes 16 in various quantities, locations, and sizes. Disc 12 is generally flat and circular and provides a tip of first end 10 in the illustrated example, but the tip of first end 10 may be of any other shape in other arrangements, such as, for example, a square or rectangular plate, or a ball, cylinder, or other rounded shape.

Second end 20 includes a hoop 22 and a set screw 24. Set screw 24 is oriented such that it may be rotationally driven by a driver from outside of hoop 22 to extend into the space encircled by hoop 22 by a variable distance or to be withdrawn from the encircled space. Set screw 24 may therefore be driven from outside hoop 22 to selectively engage or disengage an object disposed within the space encircled by hoop 22. Hoop 22 thus acts a receiver that defines a socket within which modular parts may be selectively retained by driving set screw 24. Because ends 10, 20 are opposedly movable relative to one another, the tool may be used to trap and compress a bone between first end 10 and any modular part retained within hoop 22. Hoop 22 is merely one example of the shape or structure by which a receiver defining a socket for receiving modular parts may be provided in second end 20, and alternative arrangements of second end 20 may have receivers and sockets of other shapes, such as, for example, elongate slots or square or rectangular openings.

Figure 2A:
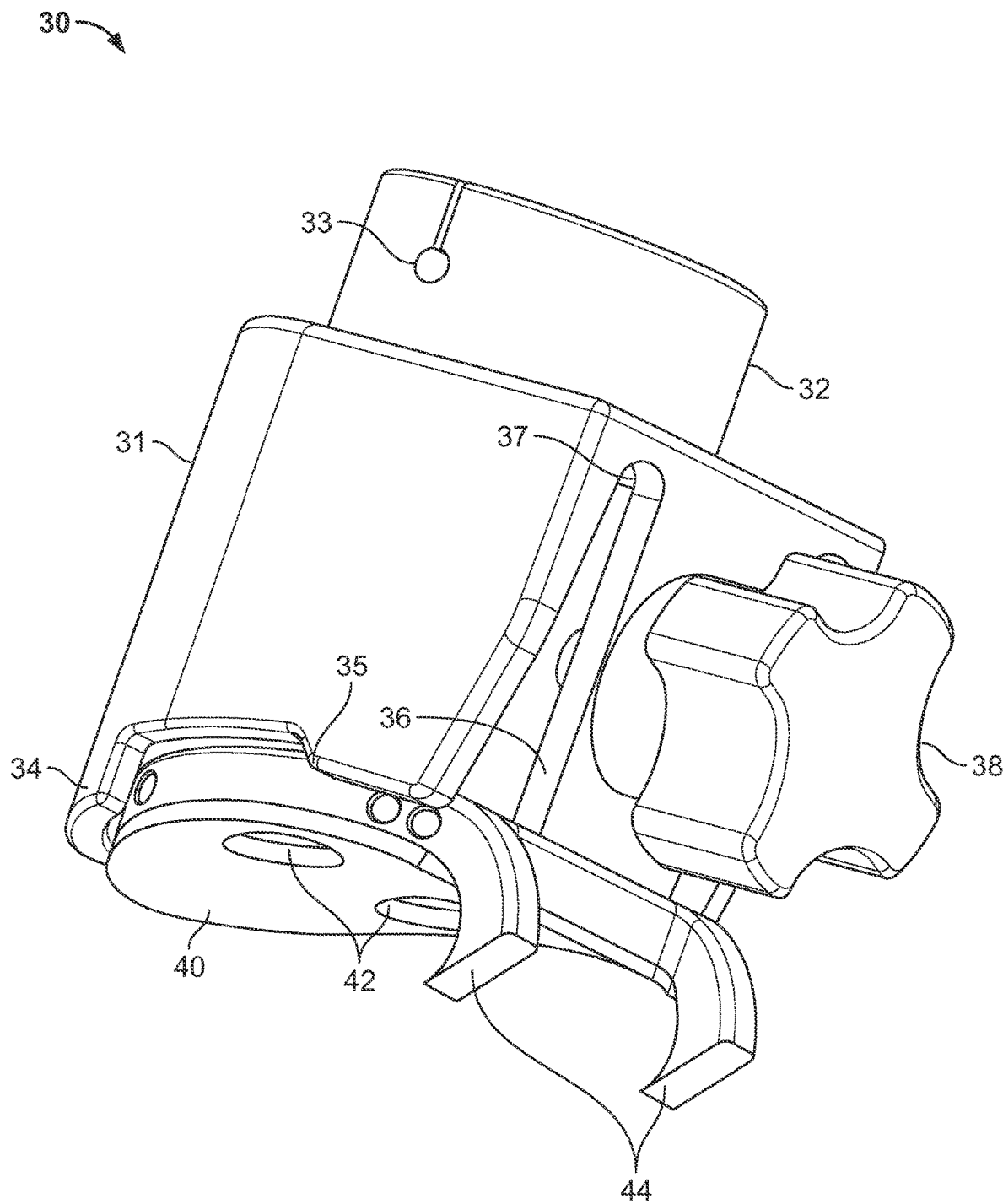
FIG. 2A is a perspective view of an insert for one of the ends of FIG. 1 with an implant retained therein.
Figure 2B:
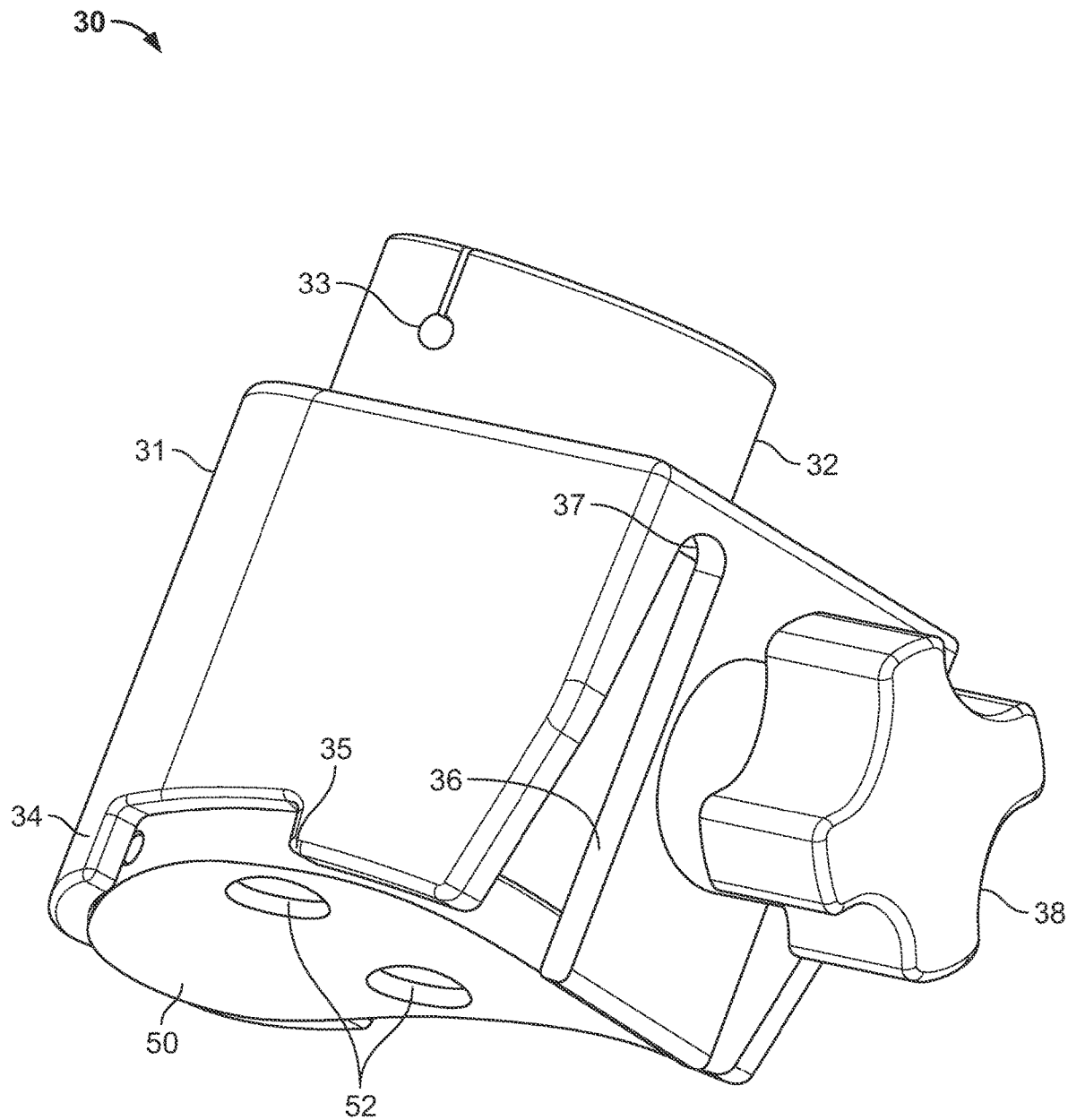
FIG. 2B is a perspective view of the insert of FIG. 2A with an alternative implant retained therein.

Insert 30 as illustrated in FIGS. 2A-2B is one example of a modular block or part that may be retained within hoop 22. Insert 30 includes a projection 32 shaped complementarily to the socket space encircled by hoop 22, so projection 32 may be closely received within hoop 22 and retained therein by driving set screw 24 into engagement with projection 32. A recess 33 may optionally be provided on projection 32 for receipt of an end of set screw 24. Insert 30 also includes one or more flanges 34, 35 extending generally away from projection 32 and arranged to closely receive an implant, such as end flange 34 and two symmetrical side flanges 35 as shown in the illustrated example, though only one of the two side flanges 35 is visible from the perspective of FIG. 2A. The one or more flanges 34, 35 extend from main body 31 of insert 30 and adjacent to an implant contacting surface of main body 31 to define a perimeter of a socket for receiving an implant. The implant contacting surface, which is not visible in FIGS. 2A and 2B, of main body 31 is contoured to conform to a corresponding surface of the implant to be received, so the implant contacting surface of main body 31 defines a back surface of the socket for receiving the implant. Insert 30 further includes a movable plate 36 which can be moved to selectively retain or release an implant between flanges 34 and 35. The perimeter established by flanges 34, 35, the implant contacting surface of main body 31, and, in at least some positions, movable plate 36 cooperate to define a socket within which an implant may be received and releasably retained.

In the illustrated arrangement, movable plate 36 is attached to a main body 31 of insert 30 by a resiliently flexible living hinge 37 that biases the free end of movable plate 36 away from main body 31 of insert 30 and against knob 38. Knob 38 is movable toward or away from main body 31 of insert 30 by rotation about a longitudinal axis of threaded post that extends through movable plate 36, not visible from FIGS. 2A and 2B, that is fixed to main body 31 and threadedly received within knob 38, fixed to knob 38 and threadedly received within main body 31, or threadedly received within both main body 31 and knob 38. Turning knob 38 to move knob 38 closer to main body 31 thus pushes movable plate 36 in opposition to the moment about living hinge 37 such that movable plate 36 may bear against an object received among flanges 34, 35. In alternative arrangements, movable plate 36 is otherwise configured to selectively either bear against or release an object received among flanges 34, 35, such as by a ratcheting mechanism or a rack and pinion arrangement. In further arrangements, movable plate 36 may be resiliently biased by other mechanisms, such as a spring instead of living hinge 37 to bias movable plate 36 away from body portion 31, or movable plate 36 may not be resiliently biased at all.

In FIG. 2A, insert 30 retains a claw implant 40, such as, for example, for engagement to a greater trochanter of a proximal femur to repair a proximal femoral fracture or osteotomy. Claw implant 40 includes two hooks 44 and two fastener holes 42 in the illustrated example, though hooks 44 and fastener holes may be provided in different quantities and locations in alternative arrangements, and either or both may be omitted entirely. Hooks 44 may be pressed into the bone when the bone is clamped between first end 10 and insert 30 to provide preliminary fixation of implant 40 to the bone, and fastener holes 42 may accept fasteners to permanently fix implant 40 to the bone and, in some cases, another implant. In some other cases, hooks 44 may be relied upon for permanent fixation, and fasteners may be unnecessary. Other examples of claw implants that can be used with the tools described herein include the Dall-Miles Trochanteric Grip Plates of the Dall-Miles Recon and Trauma Cable System (Howmedica Osteonics, Mahwah, NJ). In this regard, claw implant 40 can include more than two hooks 44, such as four hooks 44, and/or more have an extended length in the form of an elongate plate.

In FIG. 2B, insert 30 retains an alternative implant 50 instead of claw implant 40. Alternative implant 50 lacks hooks 44, but is otherwise similar to claw implant 40. Thus, alternative implant 50 includes two fastener holes 52 in the illustrated example, and all details of or potential variations upon claw implant 40 described herein, other than those specifically directed to hooks 44, are equally applicable to alternative implant 50.

Claw implant 40 and alternative implant 50 are shaped in a manner that closely conforms to a surface and socket of insert 30 that is generally surrounded by flanges 34, 35 and movable plate 36. Insert 30 therefore may hold claw implant 40 or alternative implant 50 in a stable position relative to insert 30 as ends 10, 20 are drawn together to press claw implant 40 or alternative implant 50 onto the bone. Thus, insert 30 may be used for any implant having the same overall shape as claw implant 40 or alternative implant 50. However, for implants with different overall shapes, different inserts with complementarily shaped implant contacting surfaces and sockets may be used. Such different inserts include features similar to projection 32 and can therefore be received and retained within second end 20 for use in a manner similar to insert 30. The tool that includes first end 10 and second end 20 is therefore modular in that the second end 20 can receive any of a variety of inserts suitable for various types of implants. The variety of inserts can be provided in a kit that optionally may include the tool itself or implants intended for use with the tool may be distributed with a corresponding insert.

Figure 3:
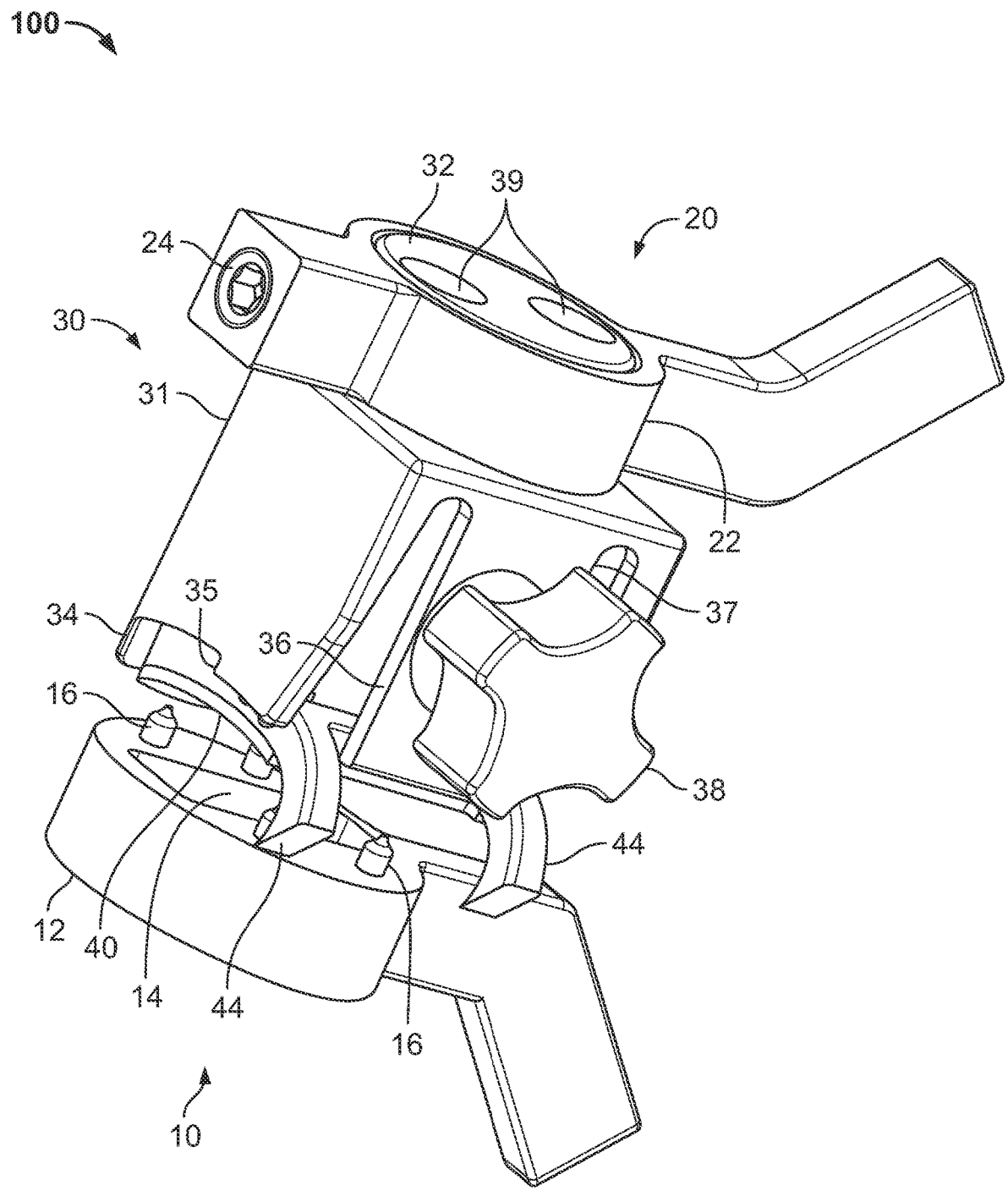
FIG. 3 is a perspective view of the ends of FIG. 1 with the insert and implant of FIG. 2A retained in one of the ends.

FIG. 3 shows ends 10, 20 as prepared for an exemplary implant delivery and bone preparation procedure. Projection 32 of insert 30 is received within hoop 22 of second end 20 and insert 30 retains claw implant 40. The tool is therefore configured such that movement of second end 20 produces corresponding movement of claw implant 40. Moreover, insert 30 is positioned such that insert 30 extends from second end 20 toward first end 10 and claw implant 40 faces toward first end 10. Thus, if a bone is placed against the spiked side of disc 10, claw implant 40 will face the bone, and drawing second end 20 toward first end 10 will press claw implant 40 onto a side of the bone opposite from disc 12.

Also visible in FIG. 3 are drill guides 39 of insert 30. In the illustrated arrangement, two drill guides 39 extend from an upper surface of projection 32 to openings at the bottom of main body 31 aligned with fastener holes 42 of claw implant 40. Drill guides 39 correspond in number and placement to holes planned to be drilled into the bone. Thus, drill guides 39 in other arrangements may differ from their placement in the illustrated arrangement.

Figure 4:
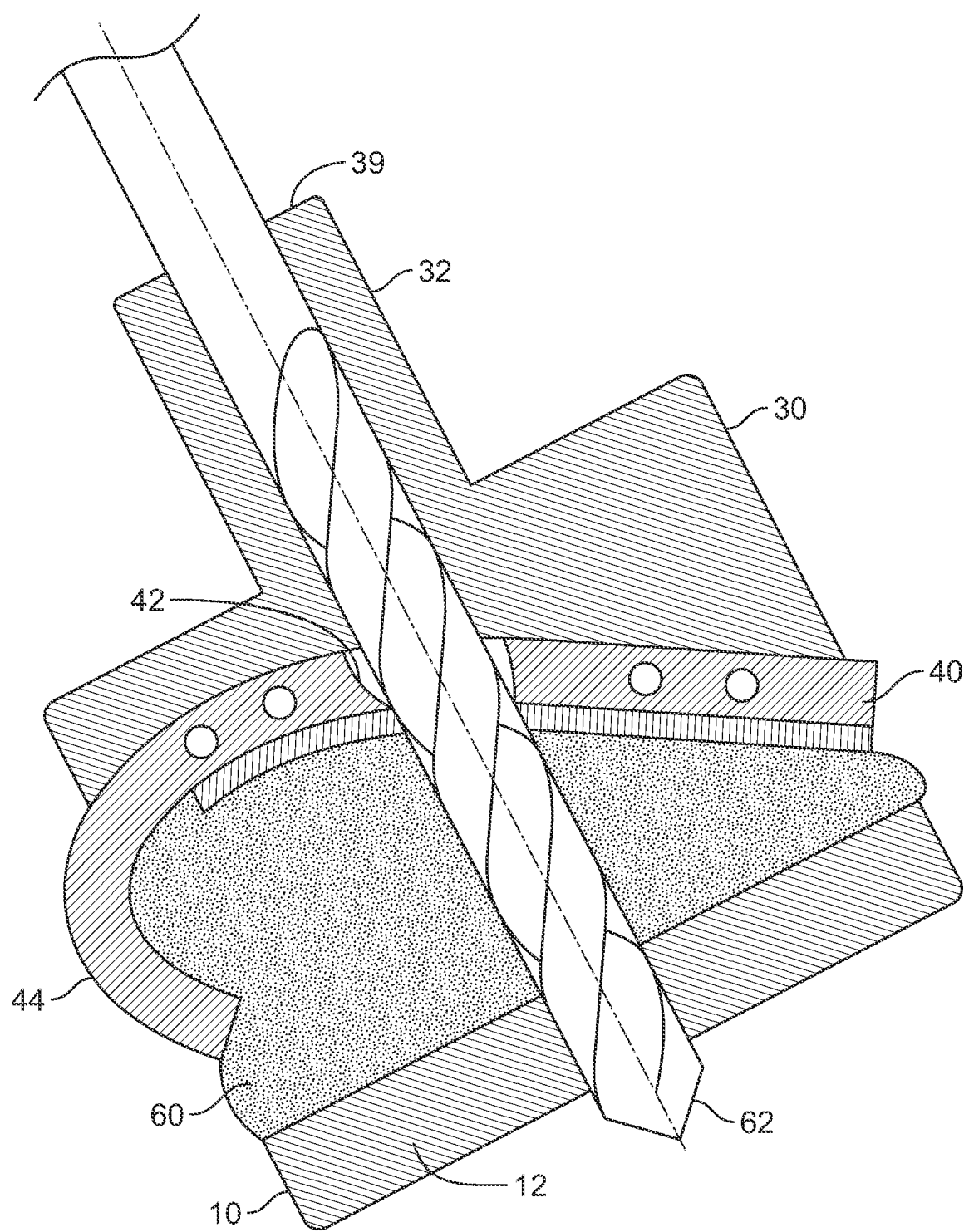
FIG. 4 is a cross-sectional view of a bone clamped by the ends, insert, and implant of FIG. 3.

FIG. 4 shows a bone 60 clamped between claw implant 40 and disc 12 of first end 10, with second end 20 acting upon insert 30 to press claw implant 40 against bone 60. Bone 60 may be a segment of a proximal femur, such as the greater trochanter, formed by an osteotomy removing such bone from the remainder of the long bone or via a fracture. In addition, to the extent soft tissue has been separated from the bone, the soft tissue may be appropriately tensioned and clamped between the bone and implant 40 to retain its desired position relative to bone 60. By drawing first end 10 and second end 20 together, hooks 44 of claw implant 40 are pressed into bone 60. After hooks 44 are pressed into bone 60 and while ends 10, 20 remain in place, a drill 62 is aligned through drill guide 39 and used to drill holes in bone 60 and optionally soft tissue aligned with fastener holes 42 of claw implant 40. Drill 62 may optionally be configured to tap threads into bone 60 such that externally threaded fasteners may be passed through fastener holes 42 and threadedly engaged to the holes drilled in bone 60. Self-tapping fasteners may also be used either instead of drill 62 or after drill 62 has created a pilot hole in bone 60 to create threaded holes within bone 60 aligned with fastener holes 42. The drill 62 extends into and through clearance hole 14 and can therefore pass entirely through bone 60 without contacting disc 12. Fasteners may be placed through fastener holes 42 and bone 60 after drill 62 is removed and either before or after second end 20 and insert 30 are removed.

Figure 5:
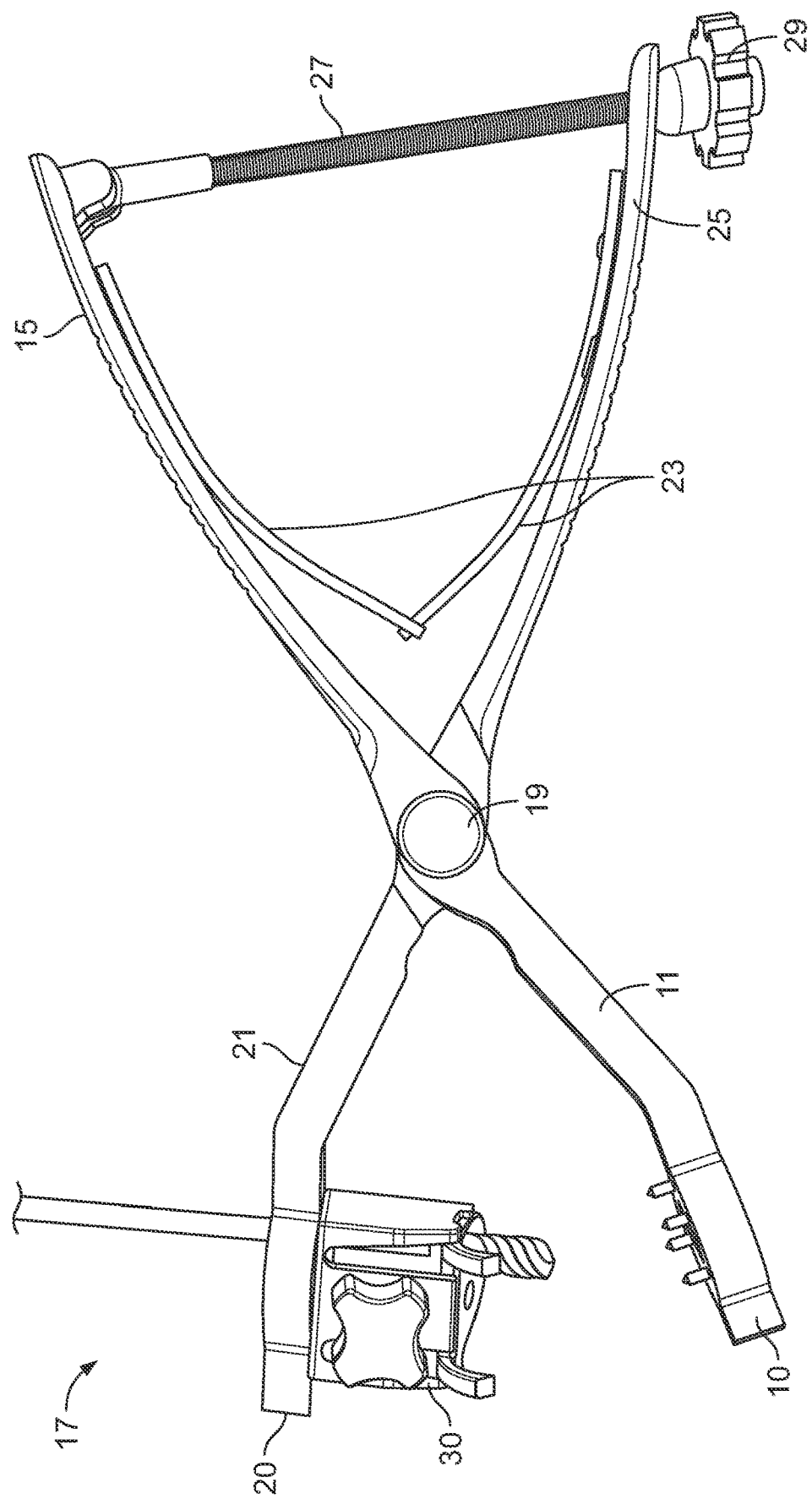
FIG. 5 is a perspective view of a tool having the ends of FIG. 1.

As shown in FIG. 5, ends 10, 20 may be part of a tool 17 of a scissors- or forceps-like construction. First end 10 is at an end of a first bar 11 having a first handle 15, and second end 20 is at an end of a second bar 21 having a second handle 25. Bars 11, 21 are joined at a fulcrum hinge 19 between ends 10, 20 and handles 15, 25. Moving handles 15, 25 toward one another will therefore move ends 10, 20 toward one another, and moving handles 15, 25 away from one another will move ends 10, 20 away from one another. A surgeon may therefore clamp an object between ends 10, 20 by tightly gasping both handles 15, 25 with one hand in a manner similar to cutting with scissors or gripping with forceps. One-handed operation of tool 17 in this manner keeps the surgeon's second hand free to operate another tool such as, for example, drill 62. However, tool 17 is merely one example of a tool or device that can include ends 10, 20, and ends 10, 20 may be incorporated into any tool or device operable to bring ends 10, 20 nearer to and further from one another.

Handles 15, 25 may optionally be resiliently biased apart by one or more springs 23, such as the elongate, resiliently flexible tabs illustrated in FIG. 5. A spring 23 may extend from each bar 11, 21 toward the other bar 11, 21 as shown in the illustrated example, though in alternative examples tool 17 may only include one spring 23 extending from either bar 11, 21 toward the other bar 11, 21.

An optional threaded rod 27 and knob 28 cooperate to provide a mechanism for tightening handles 15, 25 and ends 10, 20 toward one another and for adjusting a maximum difference between handles 15, 25 and a maximum distance between ends 10, 20. Rod 27 extends through second bar 21 at second handle 25 and is coupled to first bar 11 at first handle 15. Knob 29 is disposed on rod 27 at a location on an opposite side of second bar 21 and second handle 25 from rod's 27 point of coupling to first bar 11. Rod 27 is either fixed to knob 29 and threadedly engaged through first bar 11 at first handle 15 or fixed to first bar 11 at first handle 15 and threadedly engaged through knob 29. Either way, rotation of knob 29 about a central axis of rod 27 will advance the threaded engagement of rod 27 to either knob 29 or first bar 11 to cause knob 29 to travel nearer to or further from first bar 11 and first handle 15. This threaded movement of knob 29 adjusts the maximum distance apart between ends 10, 20 because travel of second handle 25 away from first handle 15 and second end 20 away from first end 10 is limited to the position of second bar 21 relative to first bar 11 at which second bar 21 or first handle 25 abuts knob 29.

The above-described relationship of knob 29 and rod 27 to bars 11, 21 and handles 15, 25 may be reversed in other arrangements. That is, rod 27 may instead be coupled to second bar 21 at second handle 25 and extend through first bar 11 at first handle 15, and knob 29 may instead be disposed on rod 27 at a location on an opposite side of first bar 11 and first handle 15 from rod's 27 point of coupling to second bar 21. Knob 29 and rod 27 may also be replaced by other tightening and restricting mechanisms, such as a rack and pinion mechanism extending between bars 11, 21 or handles 15, 25 or a releasable ratchet mechanism integrated into fulcrum hinge 19.

The arrangement of handles 15, 25, rod 27, springs 23, and fulcrum hinge 19 is merely exemplary, and these features may be rearranged in other examples. For example, in some arrangements, fulcrum hinge 19 is located at an intersection of bars 11, 21 on an opposite side of handles 15, 25 from ends 10, 20, making tool 17 operable in a manner more alike to tweezers or salad tongs. In various further arrangements, springs 23 may be located along bars 11, 21 either nearer or further to ends 10, 20 than fulcrum hinge 19, and rod 27 and knob 29 may be located along bars 11, 21 either nearer or further to ends 10, 20 than fulcrum hinge 19. In further alternatives, bars 11, 21 may not be pivotably or hingedly connected to one another. For example, tool 17 according to alternative arrangements may be a device that includes an actuator or multiple actuators for moving ends 10, 20 relative to one another.

Figure 6A:
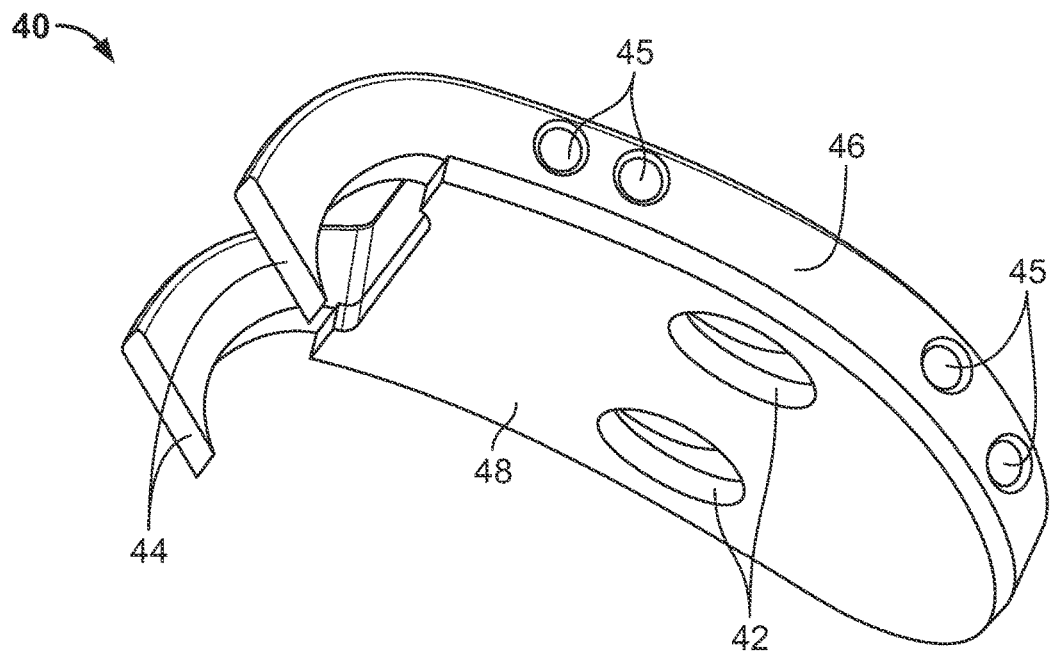
FIG. 6A is a perspective view of the implant of FIG. 2A.
Figure 6B:
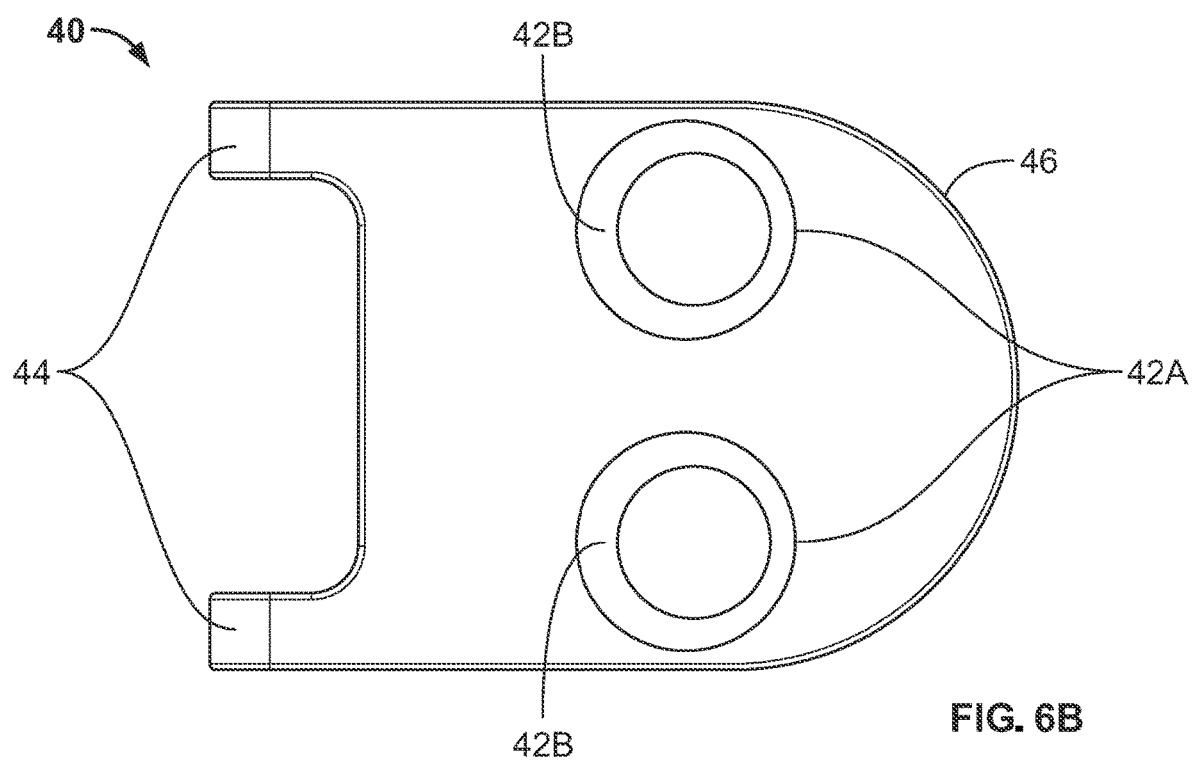
FIG. 6B is a top plan view of the implant of FIG. 2A.
Figure 6C:
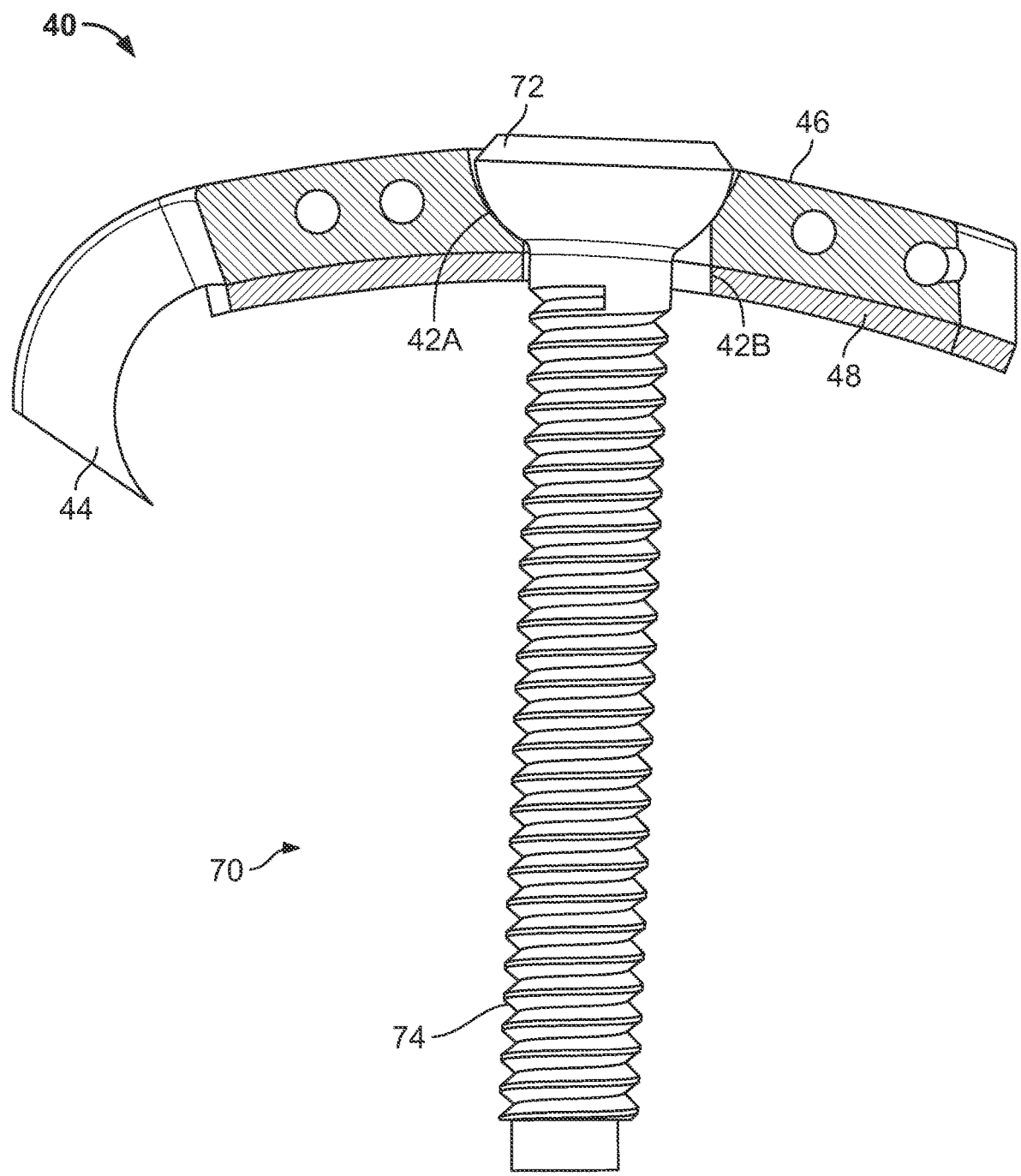
FIG. 6C is a cross-sectional view of the implant of FIG. 3 with a fastener extending therethrough.

FIGS. 6A-6C show additional details of claw implant 40. All details described with regard to FIGS. 6A-6C are optional, and implants according to other arrangements may lack any one or any combination of such details.

Claw implant 40 includes both a body layer 46 and an osteointegrative layer 48. Body layer 46 is constructed of a material and structure intended to provide a surface that does not face the bone upon which claw implant 40 is to be implanted. For example, if claw implant 40 is intended to replace an articular surface of a patella, body layer 46 is constructed of a material having suitable mechanical properties and with a structure providing a smooth enough surface finish to act as an articular surface. Body layer 46 may therefore be any material known for use in orthopedic implants to provide articular surfaces in a prosthetic joint. Examples of such known materials include biocompatible metals, such as cobalt-chromium alloys, nitinol alloy, titanium and certain alloys thereof, and surgical stainless steel, biocompatible plastics, such as ultra-high molecular-weight polyethylene (UHMWP), high-density polyethylene (HDP), and polyether ether ketone (PEEK), and biocompatible ceramics such as aluminum oxide, calcium phosphate, zirconium oxide, and silicon oxide.

Osteointegrative layer 48 is on a side of claw implant 40 intended to rest against the bone onto which claw implant 40 is to be implanted. Osteointegrative layer 48 therefore faces in generally the same direction that claws 44 extend. Osteointegrative layer 48 may be constructed of any material and structure known for use to encourage osteointegration in orthopedic implants, including, for example, porous or beaded structures made of any of the materials listed above as suitable for body layer 46. Significant pressure may be applied during the clamping illustrated in and described above with regard to FIG. 4 to press osteointegrative layer 48 onto the receiving bone to encourage osteointegration.

Fastener holes 42 are of a two-stage structure that includes a bowl or countersink 42A and a bottleneck 42B. Bowl 42A opens on a surface of claw implant 40 provided by body layer 46 and tapers narrower to end in bottleneck 42B, and bottleneck 42B opens on a surface of claw implant 40 provided by osteointegrative layer 48. As shown in FIG. 6C, a fastener 70 may include a round head 72 and a shank 74. Shank 74 is externally threaded and flat ended in the illustrated example, meaning that fastener 70 is a bolt, but in other arrangements fastener could be a screw, a nail, or any other type of fastener. Shank 74 gives fastener 70 an overall elongate shape that extends along an axis, and head is a portion of fastener 70 having the largest diameter normal to the axis. Head 72 has a curvature complementary to bowl 42A and shank 74 has a diameter less than a diameter of bottleneck 42B, but greater than the diameter of shank. Fastener 70 may therefore be disposed shank 74 first into bowl 42A and through fastener hole 42 so that head 72 can sit at any one of a range of possible angular positions within bowl 42A defined by the size and shape of bottleneck 42B and diameter of shank 74. Fastener hole 42 thus has the potential to accommodate multiple possible trajectories of fastener 70, meaning holes for accepting fastener 70 can be drilled into the bone upon which claw implant 40 is to be implanted at multiple angles relative to the implanted position of claw implant 40.

In the illustrated example, bottleneck 42B is circular and sized relative to shank 74 such that moving shank 74 from abutment with any point on bottleneck 42B to an opposite point on bottleneck 42B causes fastener 70 to rotate 30° relative to claw implant 40 while head 72 is seated within bowl 42A. Stated another way, if fastener 70 is initially located through fastener hole 42 such that head 72 is seated in bowl 42A and shank 74 is centered within bottleneck 42B, fastener 70 may be rotated up to 15° in any direction relative to claw implant 42 while head 42A remains seated in bowl 42A, but rotation further than 15° is prevented by abutment of bottleneck 42B by shank 74. Bottleneck 42B in other arrangements can have larger or smaller diameters and differ in cross-sectional shape, thereby defining different ranges of possible angular positions of fastener 70 relative to claw implant 40 while head 72 is seated within bowl 42A.

Implant 40 may also include transverse holes 45 that extend through body layer 46 in a direction transverse to fastener holes 42 and generally parallel to osteointegrative layer 48. Such hole 45 allow wires/cables, such as cerclage wires, Dall-Miles cables, and the like, to be passed through implant 40 so that they can be used to encircle multiple bone segments and compress them together.

Claw implant 40 or alternative implant 50 may be implanted upon a greater trochanter, such as to secure a bone segment, such as bone 60, to the proximal femur. Alternatively, an patellar implant, as known in the art, can be implanted on a patella so as to replace an articular surface or other portion of the patella that has been removed by reconditioning.

Figure 7A:
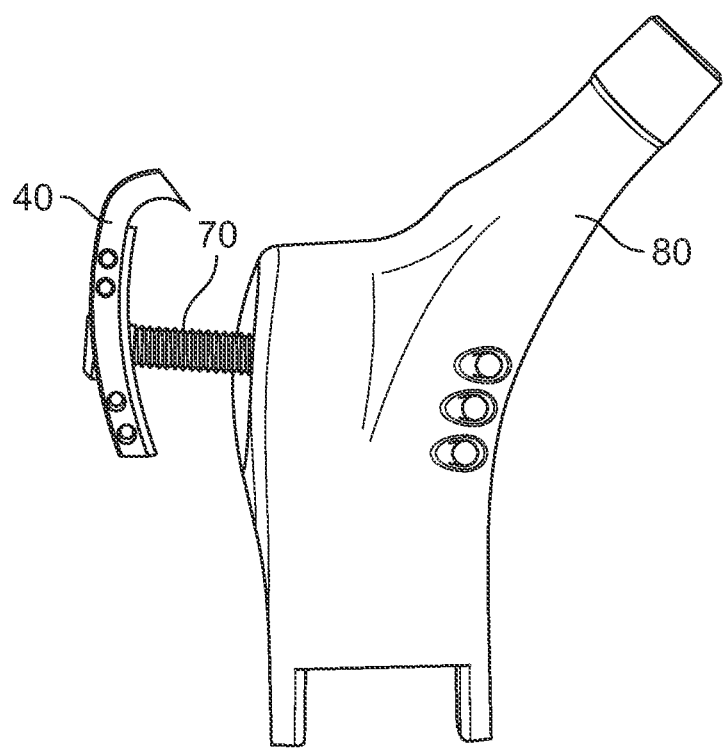
FIG. 7A is a side elevation view of a femoral implant with the implant of FIG. 2A fastened thereto.
Figure 7B:
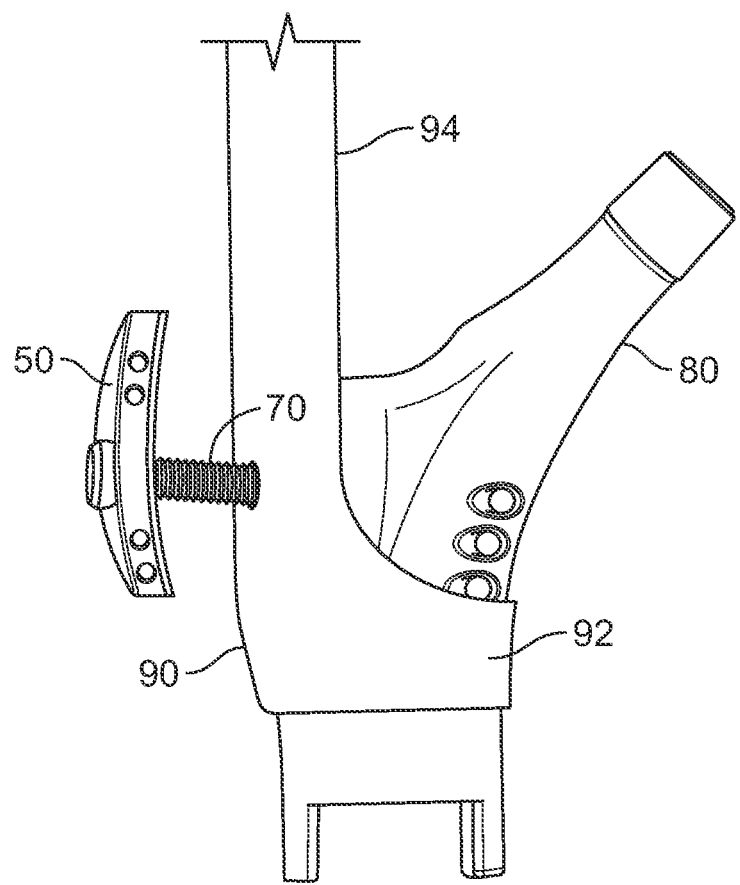
FIG. 7B is a side elevation view of the femoral implant of FIG. 7A with the implant of FIG. 2B fastened thereto.

Claw implant 40 or alternative implant 50 can also be fastened to proximal femoral implants 80 as shown in FIGS. 7A and 7B, respectively, to provide an anchor for soft tissue to secure it to the proximal femoral implant 80. Implant 80 may be used in a limb salvage procedure where the natural proximal femur has been removed due to disease, such as cancer, or severe trauma. Also included with implant 80 is a filamentary sleeve or sock 90 that has a loop portion 92 wrapped about implant 80 to secure it thereto and a tail portion 92 extending superiorly therefrom along a greater trochanter region of implant 80. To enable implant 40 or 50 to act as an anchor, tail end 94 of sleeve 90 and soft tissue, optionally after a part of the natural femur has been removed to accommodate proximal femoral implant 80, may be grasped together via tool 47 and drilled in a similar manner as bone 60 as illustrated in and described above with regard to FIG. 4. Tool 17 may be used to sandwich or clamp soft tissue, which may be under tension, between tail end 94 and implant 40, 50 such that implant 40, 50, soft tissue, and tail 94 will remain in place during drilling and/or driving of a fastener 70. Fasteners 70 may be driven through implant 40, 50 and the holes drilled through tail 94 and soft tissue and into implant 80 to implant 80. Alternatively, or in addition to, soft tissue may be sutured to tail end 94 of sock 90. Over time the soft tissue, which will be compressed between implant 40, 50 and sock 90, will integrate into the structure of sock 94 for enhanced, long-term securement.

Sock 90 shown in FIG. 7B is a coarse fabric or mesh having a texture that promotes adhesion and integration of soft tissue. Sock 90 is similar to the filamentary fixation devices described in U.S. Publication No. 2020/0038192, filed on Jul. 29, 2019, the entirety of which is hereby incorporated by reference herein. Though shown to be used with alternative implant 50 in FIG. 7B, alternative implant 50 may be used to anchor soft tissue to implant 80 without sock 82, and sock 82 may be used in conjunction with proximal femoral implant 80 when claw implant 40 is used therewith, as shown in FIG. 7A.

Figure 8A:
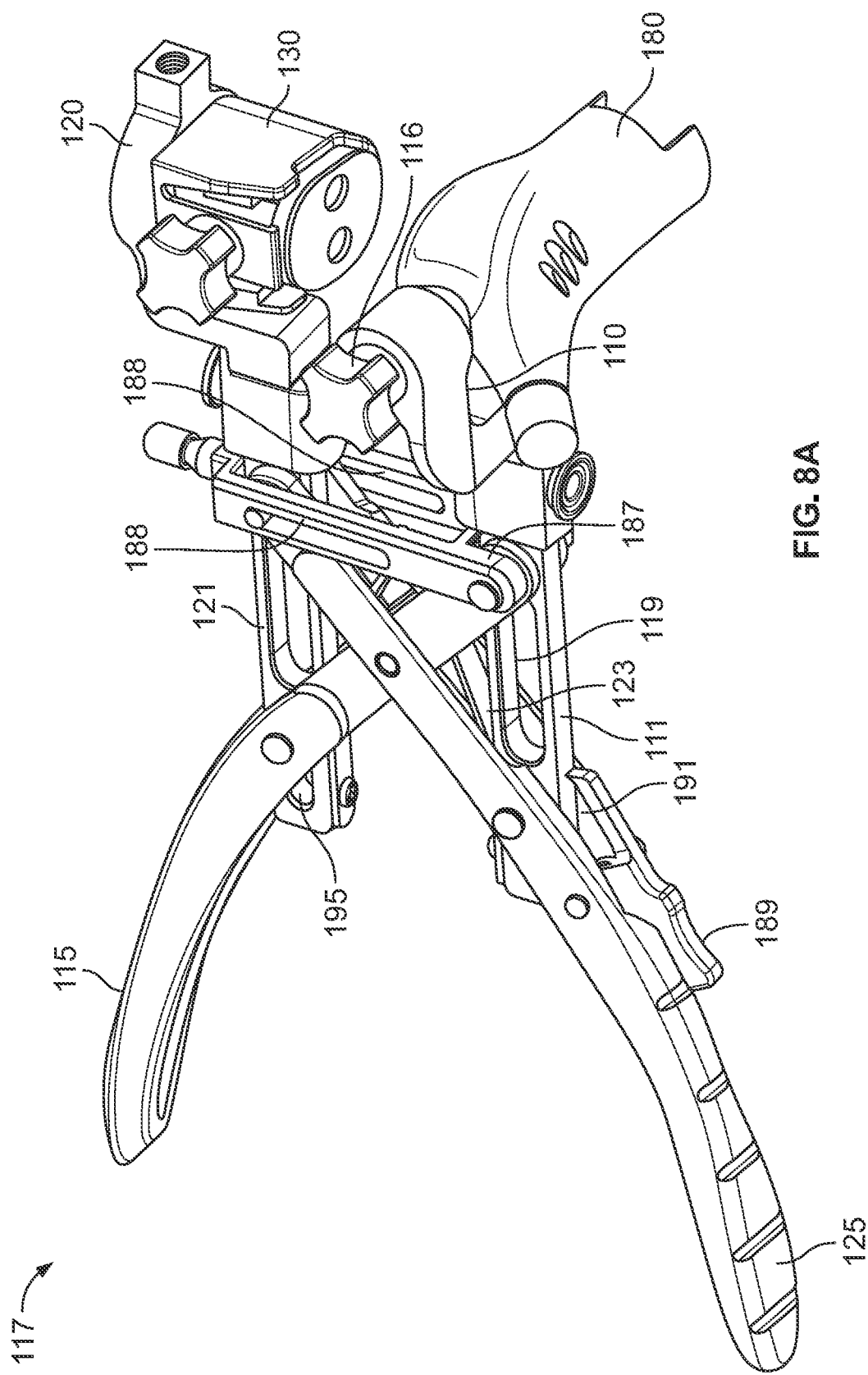
FIGS. 8A and 8B are lower and upper perspective views, respectively, of a tool according to another arrangement.
Figure 8B:
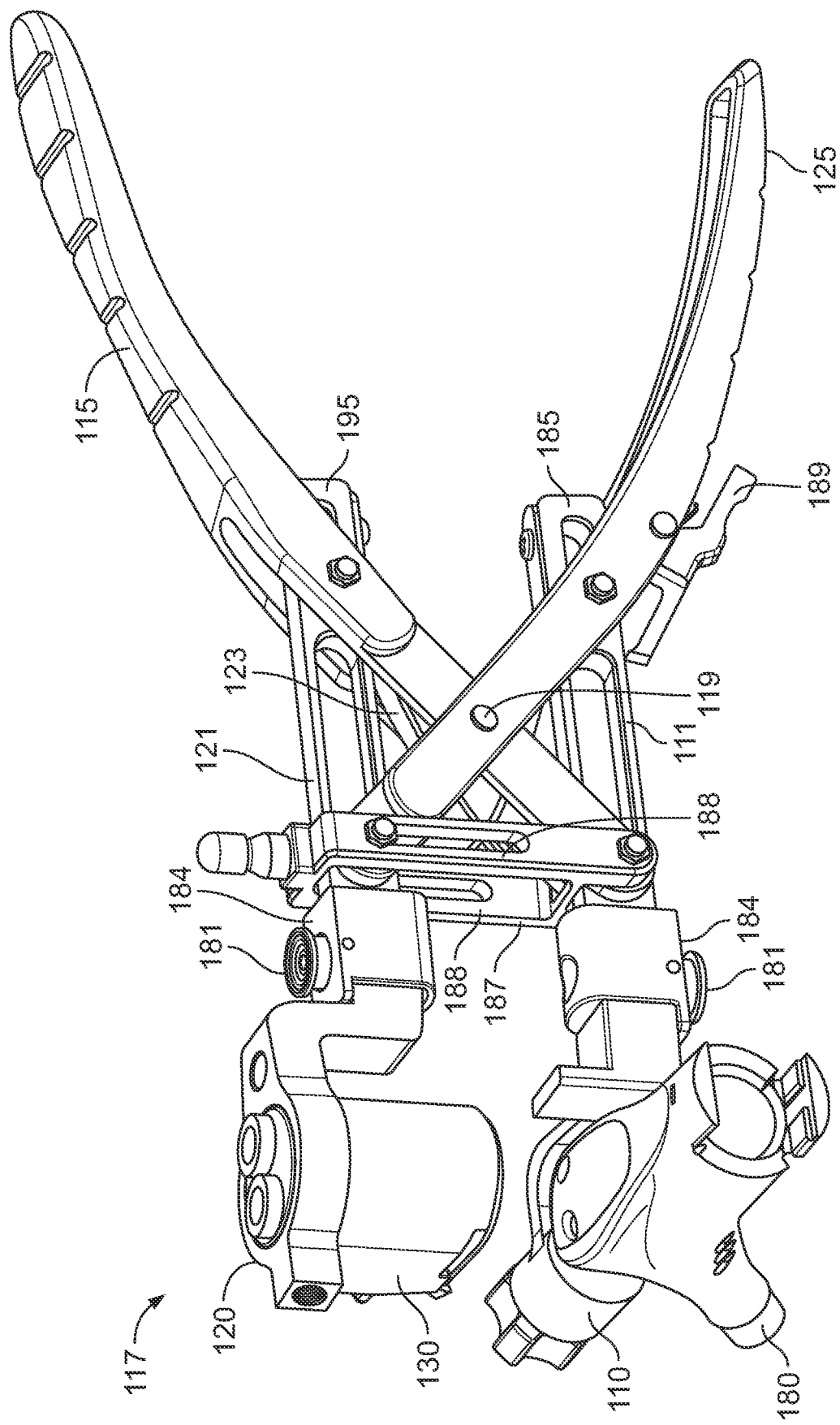

FIGS. 8A and 8B show a tool 117 according to another arrangement. Tool 117 is generally like tool 17 except for differences described herein or illustrated in the figures. Tool 117 includes a first handle 115 and a second handle 125 pivotably connected to each another at a fulcrum hinge 119. Springs 123 bias handles 115, 125 toward a rest position in which handles 115, 125 are spaced apart from one another at their proximal and distal ends.

Handles 115, 125 are also connected together via a pin-slot assembly that constrains tool ends 110, 120 connected at respective ends thereof to axial/linear movement, as explained further below. The pin-slot assembly includes a plurality of slotted bars that connect to handles 115, 125 via a pin-slot arrangement which serves to translate curvilinear motion of select points on handles 115, 125 to linear motion at their distal ends. In the particular embodiment depicted, such pin-slot assembly includes a first slotted bar 111 which is connected to an intermediate portion of second handle 125 between its proximal and distal ends and at a relatively distal point of first handle 115 at or near its distal end. In this regard, second handle 125 is slidingly and pivotably engaged to a slot 185 of first slotted bar 111 via a pin, and first handle 115 is pivotably engaged to first slotted bar 111 via a pin. Similarly, a second slotted bar 121 is pivotably and slidably connected to an intermediate portion of first handle 115 between first handle's 115 proximal and distal ends via a pin through a slot 195 of second slotted bar 121, and second slotted bar 121 pivotably is connected at a relatively distal point to second handle 125 at or near second handle's 125 distal end via a pin.

Additionally, a third slotted bar or slotted fork 187 is positioned generally perpendicular to first and second slotted bars 111, 121, and first and second handles 115, 125 are connected thereto at their respective distal ends. More specifically, the distal end of first handle 115 is pivotably connected to third slotted bar 187 but is constrained from sliding movement relative thereto. On the other hand, the proximal end of second handle 125 is both pivotably and slidingly connected to third slotted bar 187 via a pin and elongate slots 188 of third slotted bar 187. By way of this arrangement, first slotted bar 111 and second slotted bar 121 are thus generally configured to remain parallel to one another, or at least at a constant or nearly constant angle relative to one another, as the handles 115, 125 are manipulated to pivot relative to one another about fulcrum hinge 119. A locking pawl 189 is coupled to second handle 125 and selectively engages ridges 191 along first slotted bar 111 to secure tool 117 at spaced increments. Thus, each slotted bar 111, 121, 187 are pivotably and slidingly connected to the handles 115, 125, and the slots 185, 188, 195 in slotted bars 111, 121, 187 which enables distances between each slotted bar's 111, 121 respective points of connection to the first handle 115 and second handle 125 to vary so that the output movement at the distal ends of handles 115, 125 is linear.

In the illustrated example, first handle 115 is pivotably connected to third slotted bar 187 but constrained from sliding relative to first slotted bar 111, while second handle is both pivotably and slidably connected to third slotted bar 187 but constrained from sliding relative to second slotted bar 121. However, in other examples, the type of connection any one or any combination of the slotted bars 111, 121, 187 has to the handles 115, 125 can be reversed. For example, in other arrangements, third slotted bar 187 could be slidably and pivotably connected to first handle 115 but constrained from sliding relative to second handle 125.

First slotted bar 111 and second slotted bar 121 each have an end disposed in or otherwise connected to a respective receiver or modular adapter 184. Receivers 184 are configured to enable modular tool ends 110, 120 to be coupled to slotted bars 111, 121. In the illustrated arrangement, each receiver 184 is a socket with an aperture for receiving a fastener 181 so that the fastener 181 may extend into the socket. Fasteners 181 may be, for example, set screws or pins configured to engage the modular tool ends 110, 120. Because slotted bars 111, 121 are configured to remain at a constant or nearly constant angle relative to each another as handles 115, 125 move, modular tool ends 110, 120 coupled thereto, as well as any inserts held by modular tool ends 110, 120, will also remain at a constant or nearly constant angle relative to each another as handles 115, 125 move.

First modular tool end 110 and second modular tool end 120 may be like tool ends 10, 20 with the exception that modular tool ends 110, 120 are adapted to be couplable to slotted bars 111, 121 by receivers 184. Alternatively, first modular tool end 110 may be an arm with a bolt 116 for coupling to an implant or prosthesis 180 as shown in the illustrated example. Prosthesis 180 is a neck portion of a total hip prosthesis. Thus, unlike tool ends 10 and 20, which may clamp a bone segment and/or a bone segment and bone plate/claw between them, tool ends 110 and 120 facilitate the clamping of a bone segment and/or bone segment and plate between an insert 130 and implant 180.

The differences between the tools 17, 117 shown and described in this disclosure can be implemented individually or in any combination in addition to the specific combinations depicted in the illustrated arrangements. For example, tools according to other arrangements could have receivers 184 for receiving modular tool ends formed at or connected directly to the distal end of each handle. In other arrangements, tools may have slotted bars configured to remain at a constant or nearly constant angle relative to one another, and a non-modular tool end may be formed at or connected directly to the distal end of each slotted bar. Also, in even further arrangements, sockets may be formed on tool ends 110, 120 while modular adapters 184 located at the ends of slotted bars 111, 121 are adapted to be received within the sockets of such tool ends 110, 120.

Figure 9A:
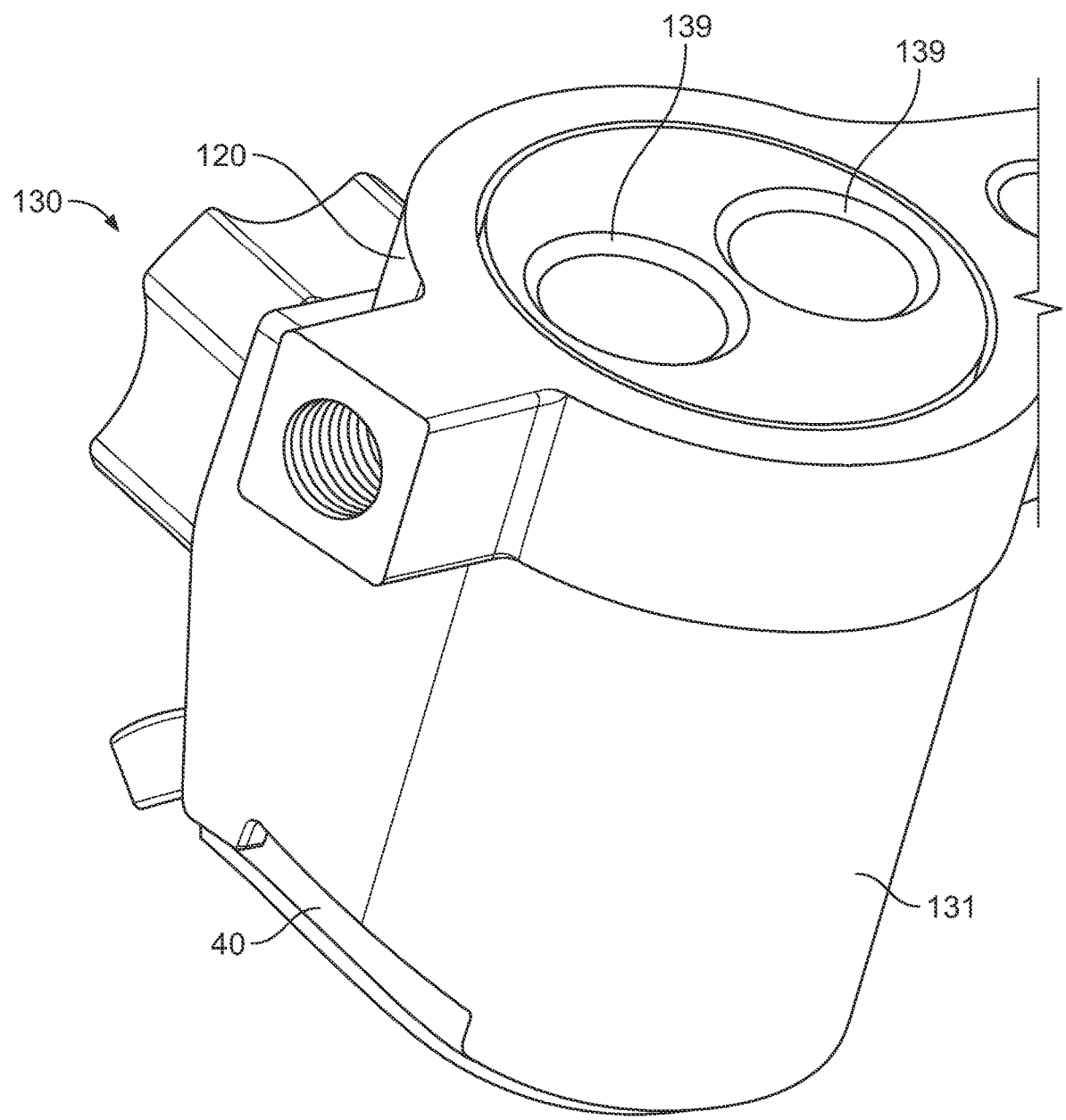
FIG. 9A is an upper perspective view of an insert according to another arrangement.
Figure 9B:
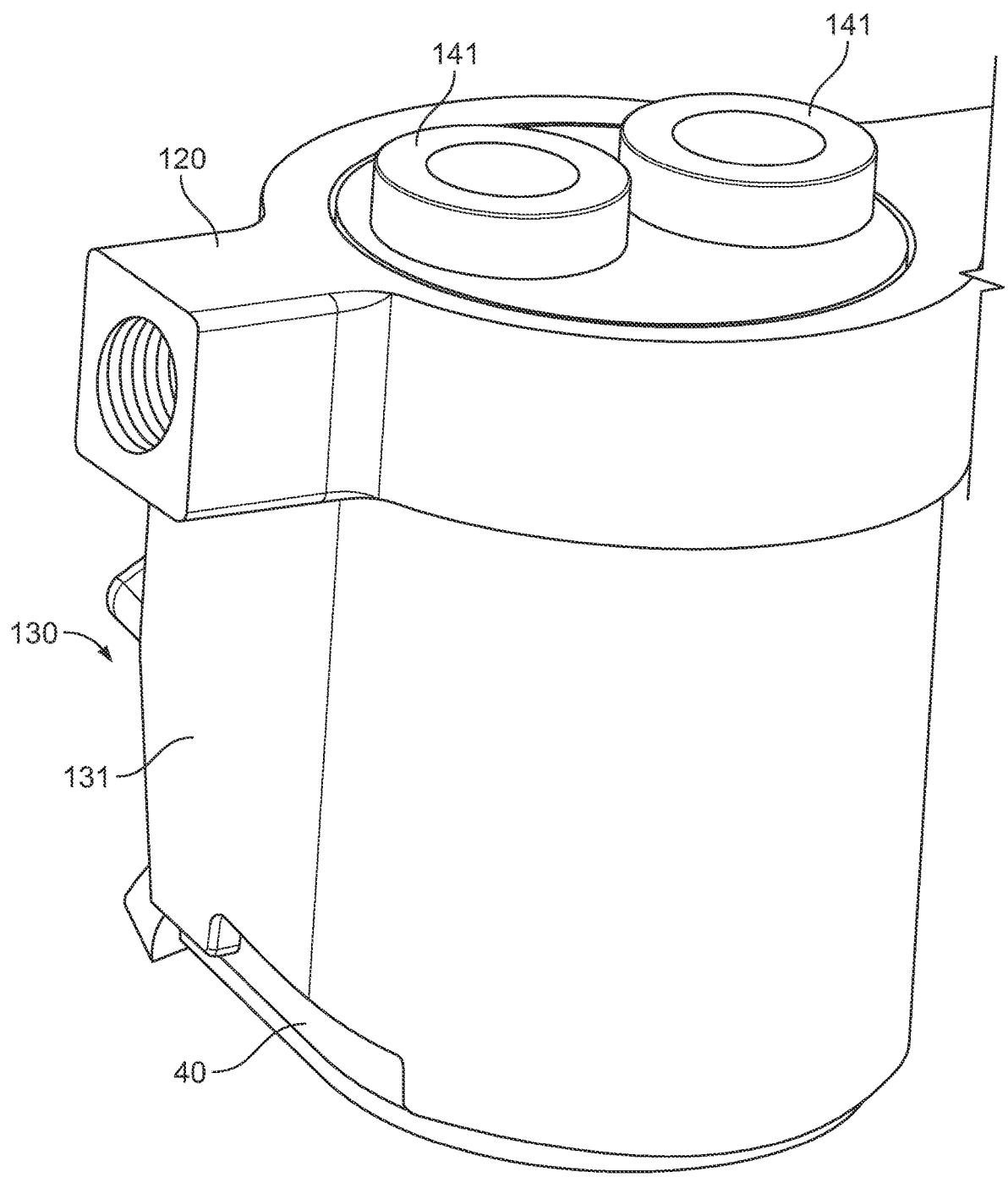
FIG. 9B is an upper perspective view of the insert of FIG. 9A with removable bushings inserted therein.

FIGS. 9A and 9B show an insert or block 130 according to another arrangement, which is usable for holding implants such as implants 40, 50. As shown in FIG. 9A, insert 130 is generally like insert 30 with the exception that guide holes 139 of insert 130 are somewhat larger in diameter relative to the drill they are configured to guide than guide holes 39 of insert 30. Insert 130 is also provided with removable bushings 141 that are sized to be received in guide holes 139, as shown in FIG. 9B.

The external diameter of bushings 141 is matched to the internal diameter of guide holes 139 to minimize lateral movement of bushings 141 within guide holes 139. The internal diameter of each bushing 141 is matched to a drill intended to be guided through that bushing 141 to constrain the drill to an intended drilling axis extending through the respective one of the guide holes 139. Bushings 141 are therefore usable in cooperation with guide holes 139 to guide a drill or drills narrower than guide holes 139 to intended locations.

The use of relatively large guide holes 139 with removable bushings 141 enables passage of objects larger in diameter than the guided drill through guide holes 139 to the drilled holes after the drill and bushings 141 have been removed, but while insert 130 remains clamped to the bone. The guided object may be, for example, a bolt, screw, nail, or other fastener, such as fastener 70, having a head larger in diameter than the drill and the internal diameter of the bushings 141, but smaller than the internal diameter of guide holes 139. Bushings 141 can also protect inner surfaces of guide holes 139 from contact by drills guided therethrough, which can extend the useful life of insert 130 across multiple uses by protecting body 131 from contact with the drill bit.

Figure 10:
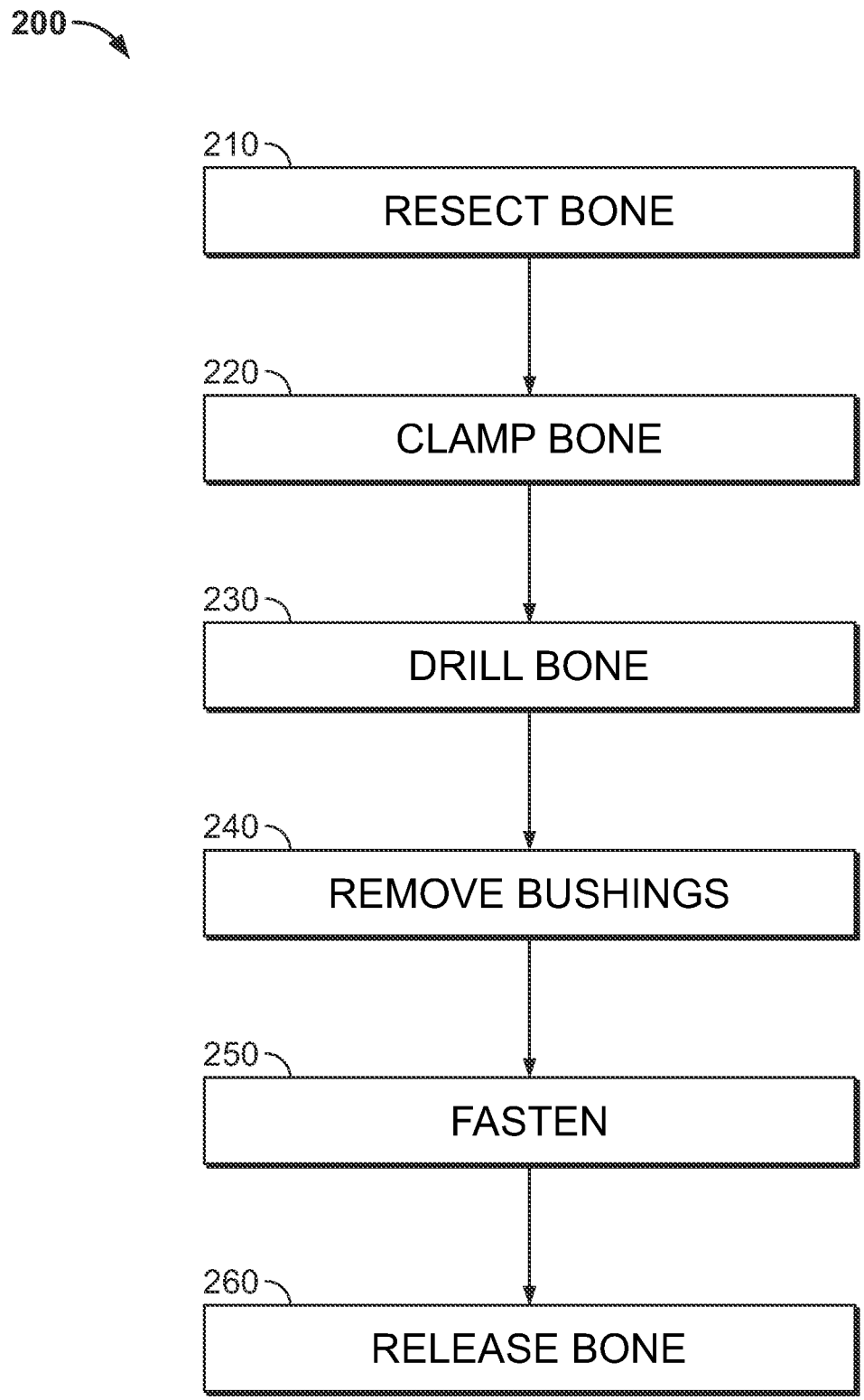
FIG. 10 is flowchart of a workflow enabled by the insert of FIGS. 9A and 9B.

FIG. 10 illustrates a workflow 200 enabled by bushings 100. Workflow 200 begins with a resection 210 of bone. Resection 210 can be used in any instance where removal of bone is indicated, such as in the course of oncological procedures or total joint arthroplasty. For example, resection 210 may be the removal of portions of bone containing cancerous tumors or of otherwise diseased or injured portions of bone.

Resection 210 is followed by clamping 220 of a portion of bone, such as a greater trochanter that has been removed from a remainder of a femur, by use of tool 117. Clamping 220 includes use of insert 130, retained by second end 120, to force an implant, such as any of the implants 40, 50 discussed above, against the bone. When tool 117 of the arrangement illustrated in FIGS. 8A and 8B is used, clamping 220 clamps the subject bone between the implant 40, 50 and the prosthesis 180. In some examples, prosthesis 180 is a proximal femoral implant such as the proximal femoral implant 80 described above.

Clamping 220 is followed by drilling 230, wherein a drill is guided through each of the removable bushings 141 held in the guide holes 139 of the insert 130 to create holes in the clamped bone. Because of the linear motion produced at the distal ends of handles 111 and 115, the axes of removable bushings 141 and guide holes 139 will always have the same orientation relative to a workpiece being clamped and through its full range of motion. After drilling 230, the bushings 141 are removed 240.

Following removal 240 of bushings 141, the implant 40, 50 is fastened 250 by driving a fastener 70 through the guide holes 139 and the holes that were drilled in the bone. Fasteners 70 may engage prosthesis 180 through the bone. Where fasteners 70 are threaded, the fasteners 70 may engage threaded openings in prosthesis 180 to enable compression of the bone between prosthesis 180 and implant 40, 50. Finally, after fastening 250 is complete, the bone is released from tool 117.

In the illustrated example, where prosthesis 180 is a proximal femoral implant, the bone may be a greater femoral trochanter. Thus, fastening 250 uses implant 40, 50 to fix the trochanter to prosthesis 180, which may be implanted at the proximal end of a femoral body before, during, or after workflow 200. The tool 117, insert 130, prosthesis 180, and implant 40, 50, may therefore be used in workflow 200 to replace the proximal end of the femur while preserving the natural soft tissue attachment to the greater femoral trochanter. Such a procedure may preserve healthy tissue where, for example, a tumor or other disease state is present at the proximal end of the tumor but does not affect the greater femoral trochanter. Moreover, prosthesis 180 in other examples could be designed to replace any other portion of bone, and workflow 200 may be used to attach any remaining portions of bone to prosthesis 180.

Although the foregoing exemplary embodiments are described in relation to a hip prosthesis, it should be understood that the devices and methods described herein may be applied to other bones and prostheses adapted therefor. For example, a patella tendon and tibial tubercle may be resected or otherwise disassociated with a tibia. The devices and methods described herein may be utilized to similarly reattached the patella to a tibia and/or to a tibial prosthesis. Exemplary tibial prostheses can be found in U.S. Pat. Nos. 10,149,763 and 11,219,528, the disclosures of which is hereby incorporated by reference herein in its entirety.

Although the concepts herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A tool for implanting an orthopedic implant upon a bone, the tool comprising:
  a body defining an implant socket for releasably retaining an implant and at least one drill guide opening into the implant socket; and
  a tip toward which the implant socket faces that is opposedly movable relative to the body for clamping the implant and bone between the body and tip.

2. The tool of claim 1, wherein the tool comprises a receiver that is opposedly movable relative to the tip, an insert socket defined within the receiver; and wherein the body is part of an insert that is configured to be releasably retained within the insert socket.

3. The tool of claim 2, wherein the receiver is a hoop and the insert socket is a space encircled by the hoop.

4. The tool of claim 2, wherein the insert includes a projection configured to extend into the insert socket and by which the insert is configured to be releasably retained in the insert socket.

5. The tool of claim 4, wherein the receiver includes a set screw drivable to extend into the insert socket by a variable distance to engage or disengage the projection.

6. The tool of claim 2, wherein the tool comprises a first bar and a second bar, and wherein the tip is an end of the first bar and the receiver is an end of the second bar, and the first and second bars are hingedly connected to one another by a hinge.

7. The tool of claim 6, comprising a first handle at an end of the first bar and a second handle at an end of the second bar and wherein the hinge connects the first bar and the second bar at a point between the end of the first bar and the first handle and between the end of the second bar and the second handle.

8. The tool of claim 6, wherein the end of the first bar and the end of the second bar are biased apart from one another.

9. The tool of claim 8, wherein the biasing is provided by at least one spring extending between the first bar and the second bar.

10. The tool of claim 6, wherein a maximum distance between the end of the first bar and the end of the second bar is adjustable.

11. The tool of claim 10, comprising:
a threaded rod coupled to only one of either the first bar and the second bar and extending past the bar to which the threaded rod is not coupled; and
a knob disposed at a location on the threaded rod on an opposite side of the bar that the threaded rod extends past from the bar to which the threaded rod is coupled such that the knob is movable toward or away from the bar to which the threaded rod is coupled by rotation of the knob about a central axis of the threaded rod;
wherein the maximum distance between the end of the first bar and the end of the second bar is adjustable by rotation of the knob about the central axis of the threaded rod.

12. The tool of claim 1, wherein the implant socket is a space defined by an implant contacting surface of the body and a perimeter defined by at least one flange extending from the body adjacent to the implant contacting surface.

13. The tool of claim 12, comprising a movable plate additionally defining the implant socket and movable toward and away from the at least one flange.

14. The tool of claim 1, wherein a hole alignable with the at least one drill guide extends into the tip.

15. The tool of claim 1, wherein the tip is a disc.

16. A tool for implanting an orthopedic implant upon a bone, the tool comprising:
a first end defining a tip;
a second end opposedly movable relative to the first end and defining an insert socket; and
an insert removably retainable within the insert socket and including an implant socket for removably retaining an orthopedic implant.

17. The tool of claim 16, wherein the insert defines at least one drill guide opening into the implant socket.

\* \* \* \* \*